United States Patent [19]
Karbachsch et al.

[11] Patent Number: 5,575,910
[45] Date of Patent: Nov. 19, 1996

[54] MEMBRANE ADSORBER FILTER MODULE

[75] Inventors: Massoud Karbachsch, Göttingen; Peter Konstantin, Neunkirchen; Günter Pradel, Göttingen; Dieter Schmidt, Rosdorf, all of Germany

[73] Assignee: Sartorius AG, Gottingen, Germany

[21] Appl. No.: 523,361

[22] Filed: Sep. 5, 1995

[30] Foreign Application Priority Data

Sep. 14, 1994 [DE] Germany .................... 44 32 627.0

[51] Int. Cl.[6] .................................................. B01D 63/00
[52] U.S. Cl. ............... 210/321.75; 210/232; 210/321.84; 210/346; 210/486; 210/489; 210/433.1; 210/436
[58] Field of Search ................. 210/321.75, 321.84, 210/232, 346, 347, 416.1, 500.1, 486, 489, 492, 656, 638, 321.75, 433.1, 436

[56] References Cited

U.S. PATENT DOCUMENTS

| | | |
|---|---|---|
| 3,925,037 | 12/1975 | Ward, III et al. ................. 210/321.75 |
| 4,624,784 | 11/1986 | Lefebvre ................. 210/356 |
| 4,661,458 | 4/1987 | Berry et al. ................. 210/651 |
| 4,735,718 | 4/1988 | Peters ................. 210/321.75 |
| 4,895,806 | 1/1990 | Le et al. . |
| 4,935,142 | 6/1990 | Sternberg ................. 210/321.75 |
| 5,143,630 | 9/1992 | Rolchigo ................. 210/486 |
| 5,437,796 | 8/1995 | Brüschke et al. ................. 210/321.75 |

*Primary Examiner*—Ana Fortuna
*Attorney, Agent, or Firm*—Chernoff, Vilhauer, McClung & Stenzel

[57] ABSTRACT

There is disclosed a filtration unit for the selective separation of substances from fluids by membrane adsorbers, comprising a plurality of filtration chambers arranged in parallel and using membrane adsorber packs having a variable number of porous laminar sections, and wherein at each membrane adsorber pack, the same pressure drop is maintained between feed and permeate.

11 Claims, 4 Drawing Sheets

MEMBRANE ADSORBER FILTER MODULE

BACKGROUND OF THE INVENTION

The invention concerns a filtration unit for the selective separation of materials from fluids by porous membrane adsorbers, and finds application in the fields of biotechnology, genetic procedures, pharmaceuticals, food and beverage industries and in environmental operations, ranging in scale from laboratory work to commercial production.

The invention is especially useful in the selective separation and purification of materials which have specific adsorption characteristics, such as bio-specific molecules, proteins, enzymes, ionizable substances and metal ions, particularly those of heavy metals. According to PCT patent application Ser. No. 92/00805, porous membrane adsorbers carry on their surfaces functional groups, ligands, interwoven fibers, or reactants capable of interaction with at least one substance in contact therewith in a fluid phase, which moves through the membrane by gravity. The term "membrane adsorber" is understood in the art as a general term for membrane ion-exchangers, ligand membranes and activated membranes. A membrane adsorber is classified according to the particular functional group, ligand or reactant carried on or in its surface.

U.S. Pat. No. 4,895,806 discloses a filtration unit for the separation of molecular components from fluid mixtures by membrane adsorbers, comprising a housing, a plurality of membrane discs separated into groups by washers, with the entire membrane disc assembly being compressed between compression rings, wherein the peripheries of the compression rings and washers are in contact with the wall of the housing so as to provide a seal to prevent leakage between the membranes and the housing wall. The disadvantages of such a design are (1) when a smaller number of membrane adsorber discs are used, the unit's adsorption capacity is too low, and (2) when a greater number of membrane discs are used, the unit suffers from an exponentially restricted flow rate, even at higher pressures.

It is therefore a principal object of the present invention to provide a membrane adsorber filter having a large adsorption capacity and large flow rates, which is capable of scale up, and which does not require a housing.

The foregoing and other objects, features, and advantages of the invention will be more readily understood upon consideration of the invention which is summarized and described in detail below.

SUMMARY OF THE INVENTION

In its simplest form, the present invention comprises a membrane adsorber cassette, the cassette comprising a plurality of filtration chambers arranged in parallel with respect to each other and substantially perpendicular to the incoming feed flow, said chambers being provided with membrane adsorber packs. The membrane adsorber packs are formed from a variable number of laminar sections of porous membrane adsorbers and the pressure differential between the feed and permeate sides of each membrane pack remains the same, permitting substantially the same fluid flow rate through each pack. The flow rate depends on the absolute value of the pressure differential, which is dictated by the pressure at the fluid feed inlet of the filter unit and/or by the pressure at the permeate outlet. The flow rate also depends on the number of the laminar sections of porous membrane adsorbers which make up the membrane adsorber pack. The adsorption capacity of the filter unit is adjustable by varying the number of laminar sections of porous membrane adsorber which make up a membrane adsorber pack and/or by varying the number of membrane adsorber packs in the filtration unit.

By offering a choice of membrane adsorber types, by varying the number of laminar sections of porous membrane adsorber within a membrane adsorber pack, and by varying the number of filtration chambers, the invention offers the advantage of designing and fabricating filtration units capable of meeting a wide variety of filtration requirements. The filtration units may be operated in dead-end or cross-flow modes, individually or with several units. Thus, in a single filtration run a multiplicity of substances which are adsorbent-specific to different membrane adsorber types may be separated. Use of the present invention leads to economy of investment, work time and energy consumption. At the same time, the invention minimizes product loss and protects the valuable substances that are separated.

DETAILED DESCRIPTION OF THE PREFERRED EMBODIMENT

Figure 1:
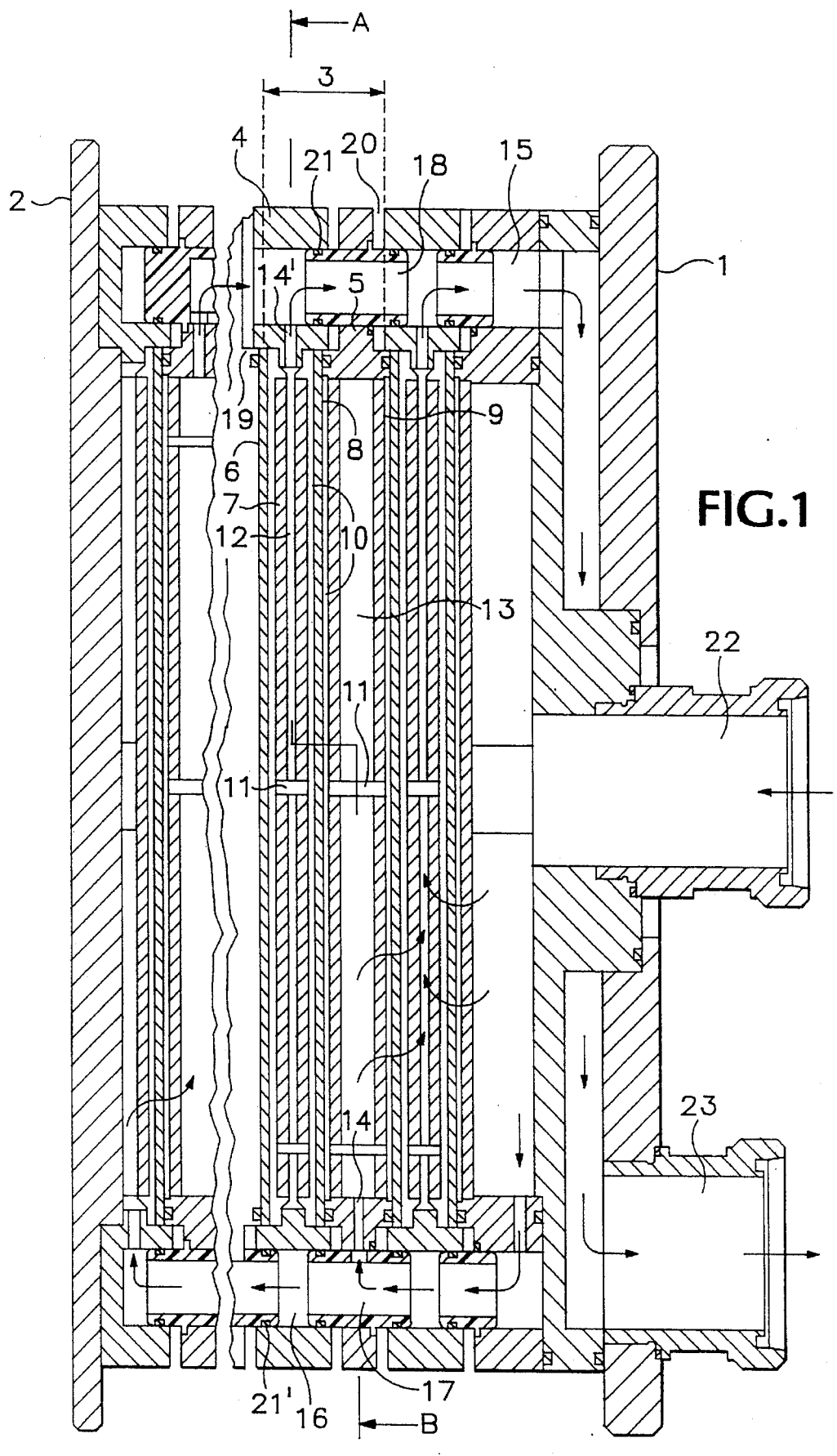
FIG. 1 is a cross-sectional view of an exemplary embodiment of the invention.
Figure 2:
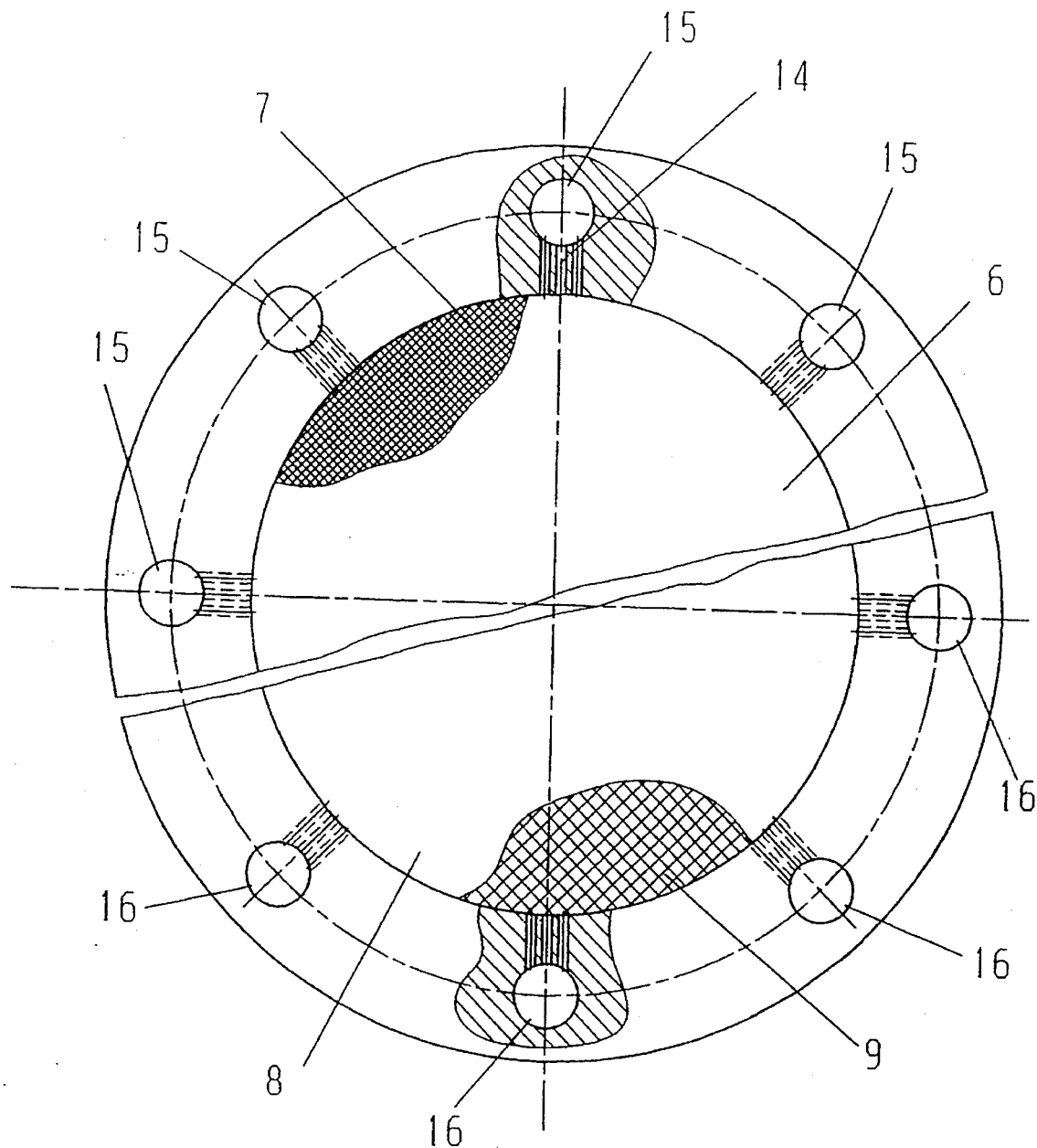
FIG. 2 is a sectional view of an annular permeate outlet and an annular feed inlet from FIG. 1 taken along A-B.

Spacers are inserted between each membrane adsorber pack, which are envisioned as alternately serving as both feed and permeate channels. To assure the same pressure differential across each membrane adsorber pack, the spacers for the incoming fluid feed and, from time to time, for the permeate discharge are in communication through fluid feed channels and permeate discharge channels. The fluid feed channel is in communication with the feed inlet on the filtration unit, and the fluid outlet is in communication with the permeate channel. The spacers are preferably also in communication with the diametrically opposite side from the feed inlet and form a permeate outlet which is connected to an effluent discharge on the filtration unit. When the filtration unit is operated in the deadend filtration mode, the permeate outlet serves mainly to deaerate the feed inlet side of the membrane adsorber pack and is closed after venting has taken place. In the case of cross-flow operation of the filtration unit, the permeate outlet may serve as a retentate discharge line and, together with the fluid feed channel, forms a retentate recycle means. The sequence of the elements of construction for the first membrane adsorber pack, for the permeate discharge spacer, for the second membrane adsorber pack, and for the feed inlet spacer comprises the basic filtration chamber design, while the recurring units of the filtration chamber design make up the overall filtration unit. The spacers at the same time function as supports for the membrane adsorber pack and prevent backwash blockage therein.

In a preferred embodiment of the invention, the filtration chamber comprises two annular elements which, by virtue of a recess that provides free space and that is perpendicular to the laminar sections of the membrane adsorber pack, may be superimposed and slidingly joined to each other. This design, together with the use of equalizer bushings inside the fluid feed channel and the permeate outlet channel, allows a fluid-tight connection. The free space from the recesses, combined with properly dimensioned bushings, permit a leak-tight connection regardless of the number of laminar sections of porous membrane adsorbers within any membrane adsorber pack.

In accordance with the invention, up to 50 laminar sections may be included in a single membrane adsorber pack. Preferably, at least two membrane adsorber packs, each with 10 to 25 laminar sections, are contained within a filtration chamber. In this way the membrane adsorber pack may comprise single adsorptive membrane laminar sections, laid one upon the other, or a stack of laminar sections sealed at their edges by a durable elastic sealing compound to make up a filter cassette.

In a further preferred embodiment of the invention, the filtration chambers are designed so that the spacers and membrane adsorber packs are both sealed at their edges by a durable elastic sealing compound. Thus, when a plurality of filtration chambers are arranged in parallel in the direction of flow and so bound together, they form a filter cassette. Feed, permeate, and effluent discharge all flow through the filter cassette perpendicular to the laminar sections of the membrane pack. A filtration unit preferably includes two retainer end plates between which one or more filter cassettes are compressed. Each membrane adsorber pack may contain a variable number of laminar sections of porous membrane adsorber, generally from 2 to 50, preferably from 10 to 25 sections. The form and size of the sections may be chosen to fit the particular filtration need.

Depending upon the filtration application, several filtration units may be installed in parallel or in series. Should there be different materials to be separated, which are specifically adsorbable on various membrane adsorber types, such a separation may be carried out by a series of several dead-end filtration units sequentially lined up, each having the necessary type of membrane adsorber.

Filtration units of the invention operating in the cross-flow mode have proved themselves capable of handling particular separations, especially when appropriate spacers for the fluid feed are selected. For example, by the provision of spacers somewhat in the form of a grate, the volume of fluid through-put may be controlled sufficiently to prevent premature fouling of the membrane adsorber during the filtration of particulate-laden fluid.

By use of the fabrication methods noted above, filtration units of the present invention may be assembled into modules and made to fit virtually any filtration application at substantially constant flow rates.

Referring to the drawings, a filtration unit in accordance with the invention is depicted in FIG. 1, comprising two retainer end plates 1 and 2 with a plurality of sealed and aligned filtration chambers 3. Each filtration chamber 3 includes an annular permeate outlet 4 and an annular feed inlet 5. Annular permeate outlet 4 secures a first membrane adsorber pack 6, permeate outlet spacers 7 and a second membrane adsorber pack 8, while annular feed inlet 5 secures feed inlet spacers 9. Membrane adsorber packs 6 and 8 may be encased within a sheath 10, such as in the form of webbing, fleece, perforated metal or other sheet metal, which protects the membrane elements from mechanical damage, and functions as a pre-membrane filter. Multiple spacers 7 and 9 may be designed as one- or two-piece units; those depicted in FIG. 1 are two-piece in design and are provided with matching opposing gaps and are secured together and stabilized by stabilizers 11 and 11', the former connecting the permeate outlet spacers 7 and the latter connecting the feed inlet spacers 9. The matching opposing gaps in spacers 7 and 9 define radial permeate collection channels 12 and radial feed inlet channels 13, respectively. The design of spacers 7 and 9 is to prevent hindrance to fluid flow by permeate backup. In the event it is desired to minimize "dead" space or nonusable membrane surface area, radial channels 12 and 13 should be fit as closely as possible by using one-piece spacers.

Radially extending from radial permeate collection channels 12 and radial fluid feed channels 13, there are radial connecting channels 14 and 14' leading to axial permeate outlet channels 15 and to axial feed inlet channels 16, respectively, the inlet and outlet channels being located on the periphery of filtration chambers 3. Radial connecting channels 14 and 14' communicate, respectively, with annular permeate outlet 4 and annular feed inlet 5 by intersecting the same at substantially right angles. At each intersection there is an equalizer bushing; the equalizer bushings that surround radial fluid feed channels 13 are designated by the numeral 17, while those which are in communication with radial permeate collection channels 12 are designated by the numeral 18.

Multiple recesses 19 and 20 are provided in the annular spaces defined by annular permeate outlets 4 and annular feed inlets 5, the resulting voids of which permit outlets 4 and inlets 5 to slide, one within the other, and so engage to form, together with sealing elements 21 (such as in the form of O-rings), a radial fluid-tight seal for membrane adsorber packs 6 and 8 opposite radial fluid feed channels 13. By their intersection with annular feed inlets 5, equalizer bushings 17 and 18, together with sealing elements 21', form a fluid-tight connection within radial permeate outlet channels 15 and feed inlet channels 16. To this end, the void formed by recesses 19 and 20 and equalizer bushings 17 and 18 should be so dimensioned as to compensate for varying thicknesses of membrane adsorber packs 6 and 8 which may be caused by a variation in the thickness of laminar sections or porous membrane adsorber elements. The void for each membrane adsorber pack must be at least n-times the thickness of the maximum number of laminar sections of porous membrane which can be inserted, where n is that maximum number of the laminar sections. This void is, in the case of a membrane adsorber pack of 50 laminar sections, 10 mm, assuming that the thickness of a laminar section is 0.2 mm. With a 10 mm void in the filtration unit depicted in FIG. 1, a membrane adsorber pack with anywhere from 2 to 50 laminar sections may be installed. Tie rods (not shown) through end plates 1 and 2 may be used to mechanically compress the filtration unit.

To filter fluid in a dead-end mode with the filtration unit shown in FIG. 1, fluid feed is delivered under pressure through feed inlet fitting 22, then flows in turn through an axial feed inlet channel 16, then radially inwardly through a pair of fluid feed equalizer bushings 17, through radial connecting channel 14, and via radial fluid feed channel 13 and through feed inlet spacers 9 onto the initial surface of the membrane adsorber packs 6 and 8 adjacent feed inlet spacer 9. In order to leave the membrane adsorber pack as permeate, the fluid feed permeates through laminated sections of the porous membrane adsorber pack, which sections may also be sealed on their edges. This permeate is then collected for further discharge in radial permeate collection channels 12 and then flows via radial connecting channels 14, permeate collection equalizer bushings 18, axial permeate outlet channels 15 and is discharged from outlet 23. To increase the flow rate a vacuum may be applied to outlet 23.

Figure 3:
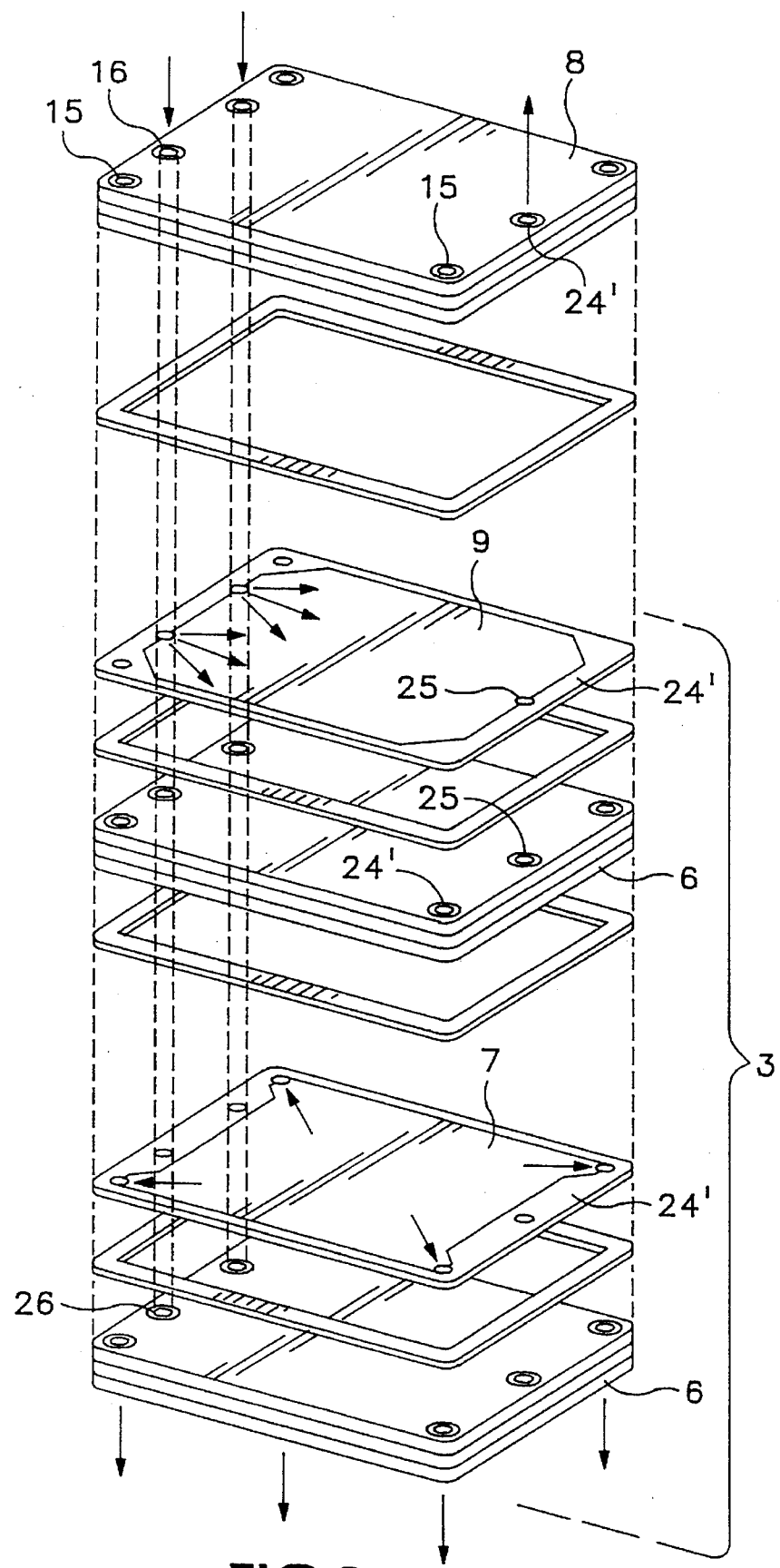
FIG. 3 is an exploded perspective view of a filter module of the invention.
Figure 4:
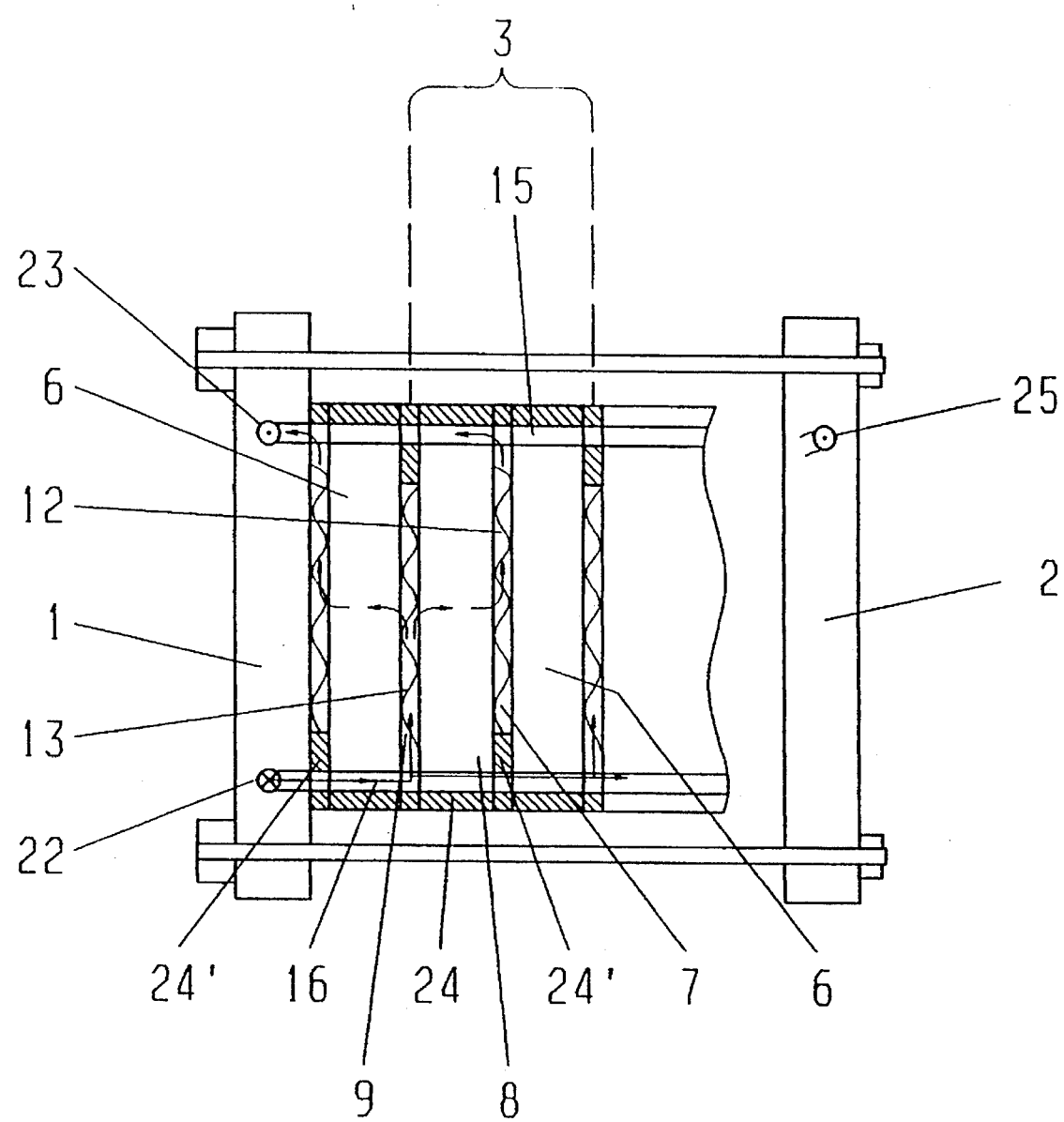
FIG. 4 is a schematic cross-sectional view of a filtration unit comprising three filter modules of the type shown in FIG. 3.

The filter cassettes shown in FIGS. 3 and 4 are adaptable to being stacked and combined into filter modules, and comprise a plurality of repetitive components which together make up filtration chamber 3. The components are a first membrane adsorber pack 6, a permeate outlet spacer 7, a second membrane adsorber pack 8, a feed inlet spacer 9 and optional sealing elements such as sealing frames (not shown), which are impregnated on their edges with a durable sealant 24 and so rendered fluid-tight. For clarity, FIG. 3 only shows the peripheral enclosures of spacers 7 and 9 of the membrane adsorber packs 6 and 8 and axial feed inlet channel 16, axial permeate outlet channel 15, air vent 25 and the retentate channel 26. The total enclosure of the cartridge with the durable sealant is not shown. Each filter cassette contains a multiplicity of filtration chambers 3 oriented toward the incoming feed and arranged in parallel. Membrane adsorber packs 6 and 8 may comprise up to 50 laminar sections of porous membrane adsorbers, preferably 10 to 25. The shape and size of the membrane adsorber packs are optional and will generally be controlled by the shapes and sizes of commercially available retainer end plates 1 and 2. The first and last section of each filter cartridge is preferably made of a filter sheath 10 which also protects the membrane adsorber pack. Sealant 24' overlaps the edges of the laminar sections in axial and radial directions, and is preferably applied in excess in the peripheral areas of the first and last sections in a small bead, preferably less than 100 μm in height. Upon compression of the filter cassettes between end plates 1 and 2 excess sealant 24' forms a gasket between neighboring filter cassettes and between the first and last cassettes and end plates 1 and 2, which prevents radial leakage.

FIG. 4 shows an embodiment of the filtration unit for dead-end filtration with filter cassettes of the type shown in FIG. 3. In this exemplary arrangement three filter cassettes are pressed between end plates 1 and 2. End plate 1 has therein feed inlet fitting 22 and outlet 23. The required clamping pressure is either hydraulically or mechanically generated. Fluid feed is forced by pressure through the feed inlet fitting 22, axial feed inlet channel 16 and into the fluid feed channels 13, then through adjacent membrane adsorber packs 6, 8 and 6. In accordance with the specific adsorptive properties of the membrane adsorber packs, the substances that are filtered from the feed are collected in the adsorptive layers of the filter cartridges. The permeate fluid feed is collected in permeate collection channels 12 and passes via axial permeate outlet channel 15 to outlet 23. Adsorbed substances in the individual filter cartridges may be selectively desorbed, eluted and recovered in an eluate collection tank (not shown). Should there be a variety of substances to be separated which are adsorbable on different types of membrane adsorbers, it is possible to employ a series of custom-engineered filtration units, the filter cassettes of which are equipped with the appropriate membrane adsorber types so that desired filtration may be effected in a single filtration run and subsequently recovered by elution.

EXAMPLE 1

An effluent solution was prepared in the following manner: albumen was separated from the yolk of fresh chicken eggs and diluted and mixed with four times its volume of a 10 mMol/L sodium acetate buffer solution of pH 5.9 (buffer A). In Test 1, after 16 hours at 4° C. the solution cleared and the pH value was set at 5.9. The so-obtained albumen solution was pumped through a filtration unit comprising a single circular-shaped, 293 mm diameter, laminar section of a porous membrane adsorber having a strongly acid ion exchange group therein.

In Tests 2 and 3 the same albumen solution was pumped through filtration units of substantially the same design as shown in FIG. 1. In Test 2 the unit was equipped with a filtration chamber having two membrane adsorber packs each with 20 laminar sections of porous membrane adsorbers of the same diameter as in Test 1; in Test 3 there were three filtration chambers with 6 membrane adsorber packs, each with 10 laminar sections of porous membrane adsorber of the same diameter as in Test 1. The buffered albumen effluent was pumped through these two units at the same temperature and pressure as in Test 1.

In all tests the pumping continued until the catalytic activity of the enzyme Lysozyme in the effluent was 10% of its activity in the effluent before filtration was commenced. Following a complete rinsing of the membrane adsorbers by pumping buffer A through them, a solution of 0.2 Mol/L potassium chloride was added to buffer A and again pumped through. The eluted protein was recovered, weighed and assessed positively for enzymatic Lysozymatic activity. The results are summarized in Table 1.

TABLE 1

| Test No. | Number of sections (adsorber) | Filtered Effluent (liters) | Isolated Lysozyme (grams) |
| --- | --- | --- | --- |
| 1 | 1 | 1.34 | 4.8 |
| 2 | 40 | 53.60 | 177 |
| 3 | 60 | 80.40 | 276 |

EXAMPLE 2

In this example a filtration unit was used that was of substantially the same design shown in FIG. 4, i.e., it comprised one filter cartridge with three filtration chambers and 6 membrane adsorber packs, each pack consisting of 10 laminar, circular sections of porous membrane adsorbers 5 cm in diameter infused with Reactive Blue 2 ligand. A protein mixture was pumped through said filtration unit, the mixture comprising 1.5 mg Cytochrome C and 1.5 mg LaEtate-Dehydrogenase (LDH) from cattle heart in 0.01 M potassium phosphate buffer solution at pH 7. Analysis of the effluent filtrate showed both proteins to be quantitatively adsorbed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A filtration unit for the separation of substances from fluids on porous membrane adsorbers, comprising:
    (a) a fluid feed inlet;
    (b) a permeate outlet; and
    (c) a plurality of filtration chambers arranged in parallel in such a manner as to have a common fluid feed channel and a common permeate outlet channel, each filtration chamber comprising in sequence
        (1) a first membrane adsorber pack,
        (2) a fluid feed spacer,
        (3) a second membrane adsorber pack, and (4) a fluid permeate spacer,
wherein said first and second membrane adsorber packs each comprise more than one planar sheet of porous adsorptive membrane, each porous adsorptive membrane in said adsorber packs located immediately adjacent the other porous adsorptive membrane(s) in the same adsorber pack, and wherein said fluid feed spacer and said fluid permeate spacer are in fluid communication and form at least one fluid feed channel and at least one permeate outlet channel.

2. The filtration unit of claim 1 wherein said fluid feed spacer and said fluid permeate spacer form a retentate discharge channel.

3. The filtration unit of claim 1 wherein said fluid feed spacer and said fluid permeate spacer are in communication with a vent.

4. The filtration unit of claim 1 wherein each of said plurality of filtration chambers comprises an annular fluid feed element and an annular fluid permeate element, said annular elements being slidably engageable with each other and having radial openings in their respective annular peripheral regions, said radial openings being in communication with channels for fluid feed and for permeate discharge and wherein said fluid feed element and said fluid permeate element each have associated equalizer bushings.

5. The filtration unit of claim 4, including an air vent in communication with said fluid feed spacer and said fluid permeate spacer.

6. The filtration unit of claim 4 including a retentate channel.

7. The filtration unit of claim 4 wherein, when said fluid feed element and said fluid permeate element engage each other, a fluid-tight filtration chamber is formed.

8. The filtration unit of claim 4 wherein said fluid feed and fluid permeate elements have on their annular peripheral region recesses to form open spaces.

9. The filtration unit of claim 8 wherein said equalizer bushings and said recesses are so dimensioned that fluid-tight filtration chambers are obtained with membrane adsorber stacks comprising up to 50 planar sheets of porous membrane adsorbers.

10. The filtration unit of claim 1 wherein said plurality of filtration chambers are configured as filtration cassettes.

11. The filtration unit of claims 1, 2, 3, 4, 5, 6, 7, 8, 9 or 10 wherein said first and second membrane adsorber pack comprise from 10 to 25 planar sheets of porous membrane adsorbers.

* * * * *